United States Patent
Griffiths

(10) Patent No.: US 7,694,983 B2
(45) Date of Patent: Apr. 13, 2010

(54) INTERLINKED DOUBLE WISHBONE SUSPENSION

(75) Inventor: Adrian Michael Griffiths, Water Side, Preston Bagot, Henley-in-Arden, Warwickshire (GB) B95 5ED

(73) Assignees: Mira Limited, Warwickshire (GB); Adrian Michael Griffiths, Warwickshire (GB)

(*) Notice: Subject to any disclaimer, the term of this patent is extended or adjusted under 35 U.S.C. 154(b) by 264 days.

(21) Appl. No.: 11/915,599

(22) PCT Filed: May 24, 2006

(86) PCT No.: PCT/GB2006/001912

§ 371 (c)(1),
(2), (4) Date: Nov. 27, 2007

(87) PCT Pub. No.: WO2006/129065

PCT Pub. Date: Dec. 7, 2006

(65) Prior Publication Data

US 2008/0191441 A1    Aug. 14, 2008

(30) Foreign Application Priority Data

May 28, 2005    (GB)    ................... 0511035.8

(51) Int. Cl.
B60G 3/18    (2006.01)
(52) U.S. Cl. ............... 280/124.135; 280/124.138
(58) Field of Classification Search .......... 280/124.135, 280/124.136, 124.138, 124.139, 124.145, 280/93.51, 93.512
See application file for complete search history.

(56) References Cited

U.S. PATENT DOCUMENTS

| | | | |
|---|---|---|---|
| 5,257,801 A * | 11/1993 | Matsuzawa et al. | ... 280/124.138 |
| 5,284,353 A | 2/1994 | Shinji et al. | |
| 5,558,360 A | 9/1996 | Lee | |
| 5,597,171 A * | 1/1997 | Lee | ..... 280/124.142 |
| 6,305,700 B1 | 10/2001 | Bruehl | |

FOREIGN PATENT DOCUMENTS

| | | |
|---|---|---|
| GB | 2 192 597 | 1/1988 |
| JP | 5085116 | 4/1993 |
| JP | 06072116 | 3/1994 |

* cited by examiner

Primary Examiner—Paul N Dickson
Assistant Examiner—Drew Brown
(74) Attorney, Agent, or Firm—Davis & Bujold, P.L.L.C.

(57) ABSTRACT

A suspension system having an upper link, a lower wishbone, a vertical hub carrier and an interlinking wishbone. The upper link is coupled, via a first spherical joint, to a vehicle sub-frame and, via a second spherical joint, to the hub carrier, the lower link is coupled, via bushings, to the sub-frame and, via a third spherical joint, to the hub carrier. The interlinking wishbone is coupled, via a hinge joint, to the lower wishbone and, via a fourth spherical joint, to the upper link. The hinge joint and the fourth spherical joint are substantially equidistant between the respective joints of the upper link and lower wishbone coupling the sub-frame and the hub carrier. The fourth spherical joint is offset from a line joining the first and the second spherical joints. The distance between the first and the second spherical joints is substantially equal to the distance between the bushings and the third spherical joint.

9 Claims, 4 Drawing Sheets

INTERLINKED DOUBLE WISHBONE SUSPENSION

This is a national stage completion of PCT/GB2006/001912 filed May 24, 2006 which claims priority from British Application Ser. No. 0511035.8 filed May 28, 2005.

FIELD OF THE INVENTION

The present invention relates to suspension systems and in particular to improvements in and relating to double wishbone suspension systems for four wheeled passenger vehicles.

The invention is applicable to driven or non-driven axles and may advantageously be applied to both front and rear suspensions.

BACKGROUND OF THE INVENTION

Conventional double wishbone front suspensions, in which both wishbones are located within the diameter of the wheel, exhibit behavior that is well suited to front suspension application in terms of roll center control, camber control, and toe control. They offer advantages over other concepts by virtue of their compactness and the close proximity of their structural attachments to the body or subframe, which allows for an efficient lightweight understructure. Impending pedestrian impact legislation will also tend to favor such systems against the widely used MacPherson strut suspensions which typically have mounting points high in the structure, close to the surface of the bonnet, which is undesirable from the point of view of protecting a pedestrian's head which might impact in that region. If double wishbones are spaced widely apart, so that the upper wishbone is located above the tire, the resulting disparate body/subframe mountings and a high profile will, like the MacPherson strut, not be conducive to good pedestrian head impact performance.

However, conventional double wishbone front suspension systems require the mounting of the wishbones to be stiff in order to minimize loss of castor angle and trail under braking, which would have the effect of degrading vehicle stability and predictability. However, stiff mounting of wishbones tends to make the vehicle ride harsh due to the consequent lack of longitudinal compliance. Suspension compliance has become a sine qua non in recent times due to increased expectations regarding passenger comfort, particularly as more cars are being specified for use with run flat tires which are significantly stiffer than conventional tires and require suspensions to be more compliant to compensate to some degree.

The objective of establishing a side elevation rotation point for the suspension under longitudinal forces is also desirable for a rear axle, especially a driven rear axle, but for different reasons then the front. A rear driven axle is required to provide "toe in" under reverse traction loading to counter the tendency of the vehicle to oversteer when the throttle is lifted mid corner. In particular the outside rear wheel is required to "toe in" under these circumstances, whilst the inside wheel is required to either "toe in" to a lesser degree or even to "toe out". Moreover longitudinal force changes at the rear axle generate fairly low loads in comparison with braking loads, typically of the order of one quarter. A further issue to be dealt with is the requirement to generate adequate "toe" change under throttle lift off, without generating excessive "toe" change under braking.

With a conventional double wishbone suspension, which would have a hub rotation point in the side elevation somewhere near the wheel center, an undesirable oversteer component developed from the inside wheel generating more "toe in" than the outside wheel, will result.

FIGS. 1 and 2 represent a conventional double wishbone front suspension viewed from the side. The front of the vehicle is towards the left hand side of the figures.

An upper wishbone 10 and a lower wishbone 12 are each attached at their inner ends to a vehicle body or subframe, by means of compliant bushings 14.

The wishbones 10 and 12 are connected at their outer ends to the upper and lower ends respectively, of a swivel hub 16, by means of spherical joints 18.

A steering mechanism (not shown) is connected by track rods (not shown) to steering arms 40 on the swivel hubs 16, by means of spherical joints, in conventional manner.

WC represents the wheel center and CP represents the contact patch of the wheel upon the ground. For the purposes of simplicity, the moments about the steering axis have been ignored i.e. the forces have been resolved as if the outer spherical joints of the upper and lower wishbones lie in the wheel plane.

Referring to FIG. 1, if a braking force $F_B$ is applied at the contact patch CP, the reaction forces $F_U$ and $F_L$ are experienced by the swivel hub 16 at the connections 18 to the upper and lower wishbone 10,12 respectively, then;

$$F_L = F_B B/A;\text{ and}$$

$$F_U = F_B(B/A - 1).$$

Referring to FIG. 2, if a force $F_C$ is applied to the wheel center WC, as would be the case if the vehicle hit a pothole or discontinuity in the road surface, the reaction forces $F_U$ and $F_L$ are experienced by the swivel hub 16 at the connections 18 to the upper and lower wishbones 10,12 respectively, then $$F_L = F_C C/D;\text{ and}$$

$$F_U = F_C(1 - C/D).$$

If the upper wishbone 10 has a longitudinal stiffness at the upper spherical joint 18 of $K_U$, resulting mostly from the elastomeric elements that join the wishbone to the body structure; and the lower wishbone 12 has a corresponding longitudinal stiffness of $K_L$ at the lower ball joint 18;

The longitudinal stiffness of the suspension at the contact patch $K_{CP}$ is, ignoring influences on stiffness from out of wheel plane effects;

$$K_{CP} = 1/(1/(K_L(A/B)^2) + 1/(K_U(A/(A-B))^2))$$

Taking the simplistic case where $A = B/2$ and $K_L = K_U = K$; then $K_{CP} = K/5$ If the suspension hits a bump, load is transmitted to the hub via the bearing at the wheel center. The longitudinal stiffness of the suspension at the wheel center $K_{WC}$ is $$K_{WC} = 1/(1/(K_L(D/C)^2) + 1/(K_U(D/(D-C))^2))$$

Taking the simplistic case where $C = D/2$ and $K_L = K_U = K$; then $K_{WC} = 2K$ therefore $K_{WC}/K_{CP} = 2K/(K/5) = 10$ Thus it is seen that in the simplistic case described, the stiffness at the wheel center WC is 10 times the stiffness at the contact patch CP. The stiffness at the wheel center WC relates to the level of isolation of the sprung mass from road induced shock inputs. The stiffness at the contact patch CP is indicative of the change in castor experienced as a result of braking. Thus it is seen that the conventional double wishbone concept is not ideal if both good levels of isolation and good castor control are to be realized.

The following prior art aims to address this dilemma by using various mechanisms to increase contact patch stiffness and castor control and/or wheel center compliance.

Honda NSX front axle—interlinked double wishbone (GB 2192597 A) and Toyota (Japanese Patent 05085116 A)

Lotus Elan 'raft' front axle.

McLaren F1 ground level elastic center front suspension.

ACC rear suspension by Steven Randle.

Toyota (Japanese Patent 06072116 A) has an interlinking piece but is substantially different in its mode of operation and doesn't address the issues discussed in this document.

The above concepts all have been directed at solving the fundamental deficiency of the conventional double wishbone suspension, in different ways.

The Honda front axle listed above both use an interlinking piece between the inboard ends of the upper and lower wishbones. The deployment of this system is best if the wishbones conform to an 'L' shape such that they offer a stiff straight transverse section between the joint to the swivel hub at the outer end and the subframe or body structure at the inboard end. This is to provide high lateral stiffness and consequently good camber control and side force steer control. This, however, tends to lead to package issues because the 'L' arms have to be long enough for the longitudinal spar of the 'L' to clear the tire envelope. This is a significant drawback since the upper wishbone would ideally be significantly shorter than the lower for optimal camber and roll center control. In addition to this, the interlinking part needs to be packaged at the point at which there is most pressure for space across the width of the car, that is just inside the back lock part of the tire envelope.

The Lotus and McLaren systems both introduce an additional 'floating' half subframe on either side of the car, to which the wishbones are attached. Longitudinal suspension compliance is provided by four bushings between the subframes and the body structure. One of the issues with this system is that the compliance at the wheel center is limited by the amount of strain permissible in these bushings, much more than 10 mm (0.394 in.) would be hard to achieve. Furthermore, the effectiveness of this compliance is decreased by the fact that longitudinal modal mass is greater, i.e. the normal unsprung mass plus the mass of the subframes. These concepts will work best when the spacing of the compliance bushings is maximized, otherwise the yaw stiffness and roll stiffness of the suspension assembly relative to body structure will be insufficient to provide good camber and toe control and will tend to dilute the advantages that the concepts set out to introduce. The subframes need to be stiff enough to provide adequate support for the wishbones and compliance bushings to which end significant structural members will be required, tending to exacerbate the weight issue.

The ACC concept is applicable to rear suspensions only. As a variant of the five link suspension system, its inboard attachment points to the body/subframe structure tend to be more disparate, requiring a larger support structure to mount it.

The present invention aims to overcome the deficiencies of conventional double wishbone suspensions by permitting excellent levels of compliance without introducing poor castor control.

The present invention is directed at solving the same issues as the prior art described above, but in a new way, thereby offering certain critical advantages over the previous concepts.

According to one aspect of the present invention, a suspension system is characterized by an upper link, the upper link being mounted at an inner end to a vehicle body or subframe by an inner spherical joint and connected at an outer end to an upper end of a vertically extending hub carrier by an outer spherical joint; a lower wishbone, the lower wishbone being mounted at an inner end to a vehicle body or subframe for pivotal movement about a horizontal, longitudinally extending axis, by means of a pair of spaced compliant bushings and connected at an outer end to a lower end of the hub carrier by a lower spherical joint; and an interlinking wishbone, the interlinking wishbone being connected at a lower end to the lower wishbone, intermediate of the inner and outer ends thereof, for pivotal movement, by a hinge or revolute joint, the interlinking wishbone being connected at an upper end to the upper link by an intermediate spherical joint, the center of rotation of the intermediate spherical joint being offset from a line joining the centers of rotation of the inner and outer spherical joints, the intermediate spherical joint being located intermediate of the inner and outer ends of the upper link, such that the ratio of the distances between the inner spherical joint and the intermediate spherical joint, and between the intermediate spherical joint and outer spherical joint; is substantially the same as the ratio of the distances between the inner end of the lower wishbone and the connection between the lower and interlinking wishbones and between the connection between the lower and interlinking wishbones and the outer end of the lower wishbone.

The function of the interlinking wishbone is to constrain the hub to rotate about a point near the contact patch when the suspension is subjected to a longitudinal load, either at the contact patch i.e. a braking load or at the wheel center. The closer the rotation point is to the point of load application, the stiffer will be the suspension in the longitudinal direction. Therefore, in order to maximize wheel center compliance and contact patch stiffness, the rotation point clearly needs to be at or near the contact patch.

In contrast to the Honda system, the present invention works best if the lower wishbone has an 'A' shape which fits nicely in the tire envelope and would therefore be significantly more compact than either of these systems. Moreover the present invention is not limited by permissible bushing strain and the additional parts required to provide the improved functionality would be significantly smaller and lighter than for the Lotus and McLaren systems. The present invention will also be more compact than the ACC system.

According to a preferred aspect of the present invention, the suspension system is applicable to the steered axle of the vehicle, the hub carrier being a swivel hub having a steering arm to which a steering mechanism, for example the track rods of a rack and pinion mechanism, may be connected, in conventional manner. The steering, the steering rack and track rods may be located either in front of or behind the axle center-line.

Alternatively, the suspension system may advantageously applied to a rear axle of the vehicle, particularly a driven rear axle.

The spring/damper units, or separate spring and damper units may be attached to either the swivel hub, upper link, intermediate wishbone or lower wishbone.

The invention is now described, by way of example only, with reference to the accompanying drawings, in which.

The same reference numerals are used in the accompanying drawings, to indicate similar components.

Figure 1:
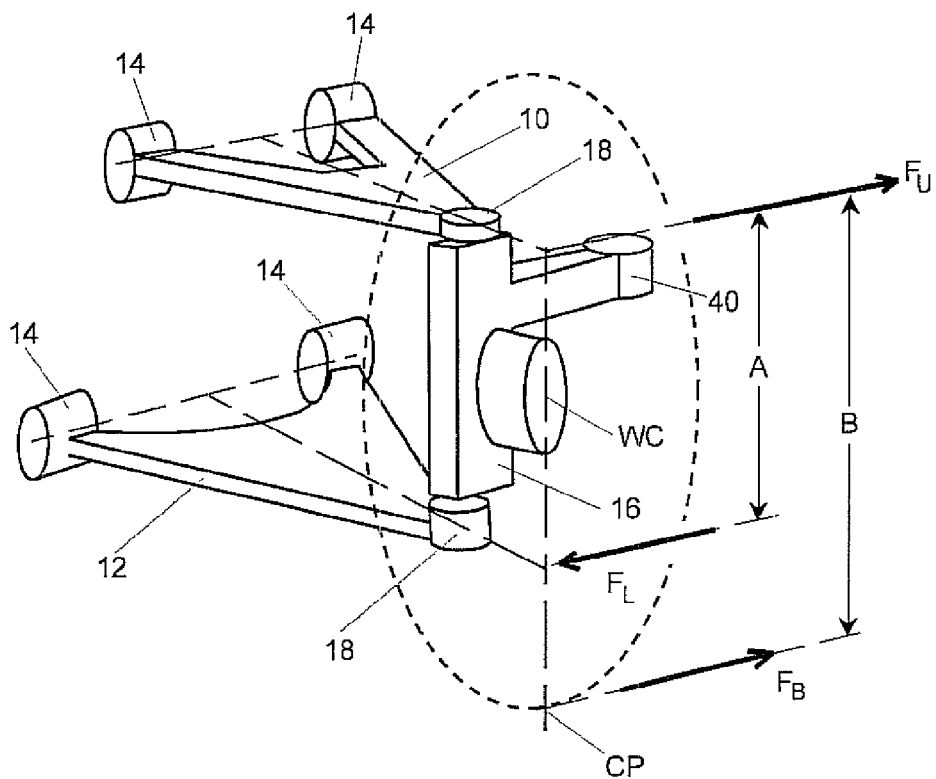
FIG. 1 illustrates diagrammatically a conventional double wishbone suspension system, showing braking forces.
Figure 2:
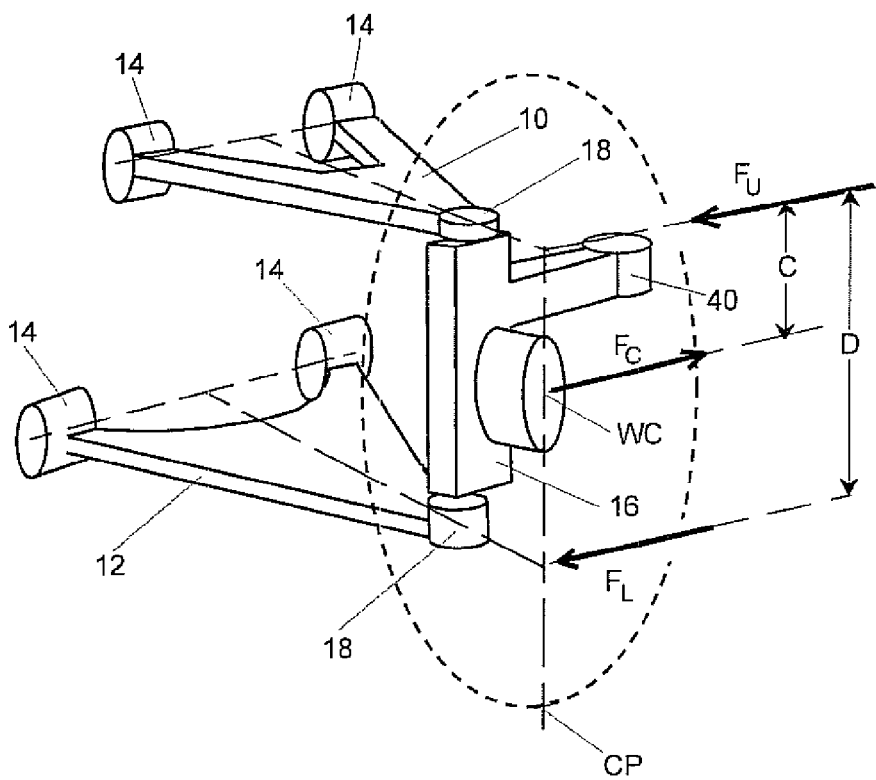
FIG. 2 illustrates diagrammatically a conventional double wishbone suspension system, showing wheel center forces.
Figure 3:
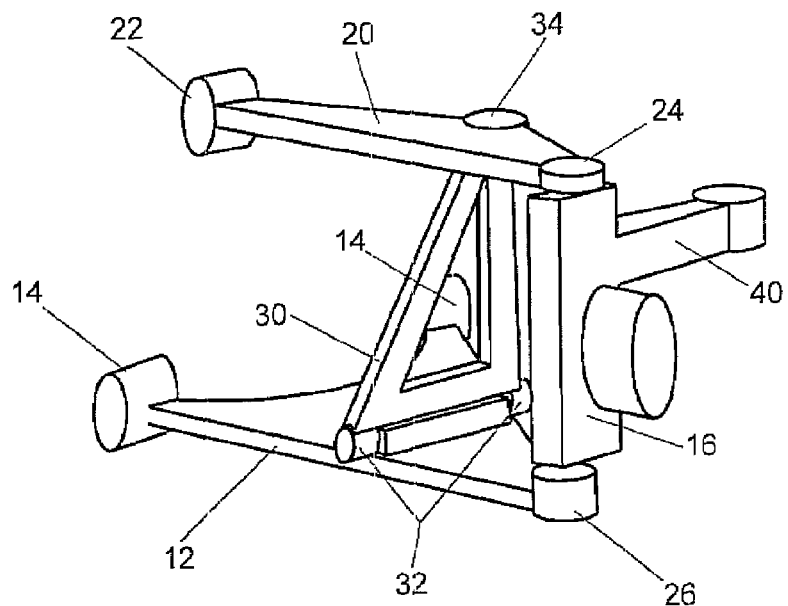
FIG. 3 illustrates diagrammatically a front suspension system in accordance with the present invention.

FIGS. 3 to 6 illustrate a suspension system in accordance with the present invention, for the front steered axle of a motor vehicle. The suspension system has an upper link 20, which is mounted at its inner end to a vehicle body or subframe by an inner spherical joint 22 and connected at its outer end to an upper end of a vertically extending swivel hub 16 by an outer spherical joint 24.

A lower wishbone 12 is mounted at its inner ends to a vehicle body or subframe for pivotal movement about a horizontal, longitudinally extending axis, by means of a pair of spaced compliant bushings 14 and is connected at its outer end to the lower end of the swivel hub 16 by a lower spherical joint 26.

An interlinking wishbone 30 is connected at its lower end to the lower wishbone 12, intermediate of the inner and outer ends thereof. The interlinking wishbone 30 is mounted to the lower wishbone 12, for pivotal movement about an axis, by means of a hinge or revolute joint 32. The interlinking wishbone 30 is connected at its upper end to the upper link 20 by an intermediate spherical joint 34. The center of rotation of the intermediate spherical joint 34 is offset by a small amount, from a line joining the centers of rotation of the inner and outer spherical joints 22,24. The intermediate spherical joint 34 is located intermediate of the inner and outer ends of the upper link 20, such that the ratio of the distances between the inner spherical joint 22 and the intermediate spherical joint 34, and between the intermediate spherical joint 34 and outer spherical joint 24; is substantially the same as the ratio of the distances between the inner end of the lower wishbone 12 and the hinge or revolute joint 32 and between the hinge or revolute joint 32 and the outer end of the lower wishbone 12, the ratio being, for example 1:1.

The small offset of the intermediate spherical joint 34 from the line connecting the spherical joints 22,24 allows a small amount of rotation of the upper link 20 about the axis between spherical joints 22,24 accommodating geometrical variations in the system and effectively preventing the system from becoming over-constrained.

A steering mechanism (not shown) is connected by track rods (not shown) to steering arms 40 on the swivel hubs 16, by means of spherical joints. Spring/damper units or separate springs and dampers (not shown) are connected between the vehicle body or subframe and the swivel hubs, upper link 20 and/or lower wishbone 12.

The hub rotation effect of the suspension system described above, due to the compliance of the lower wishbone 12, will be the sum of deflections in three modes:

a) Mode 1, axial deflection of the lower wishbone to body or subframe bushings 14 resulting mostly from longitudinal forces at the lower ball joint 26. Upon axial deflection, which should be the dominant direction if conventional bushings 14 are used, then;

longitudinal deflection
at the bushings 14 = the deflection at the hinge or
revolute joint 32;
= the deflection at the lower
spherical joint 26
= the deflection at the intermediate
spherical joint 34
= $x$ (lower wishbone translates bodily rearwards).

the corresponding deflection at the outer spherical joint 24=2x.

Figure 4:
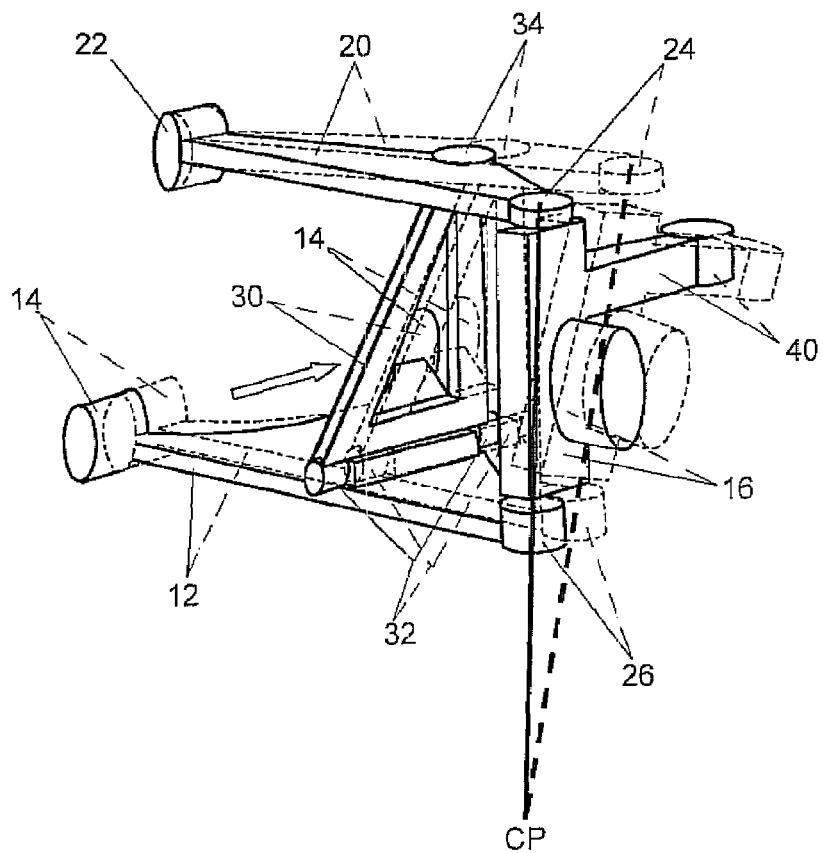
FIG. 4 is a diagrammatic illustration of the suspension system illustrated in FIG. 3, when subjected to an axial deflection.

If the outer spherical joint 24 moves 2x and the lower spherical joint 26 moves x then the rotation point of the swivel hub 16 should be somewhere near the contact patch CP, as illustrated in FIG. 4.

b) Mode 2, radial deflection of the lower wishbone to body or subframe bushings 14, in the plane of the lower wishbone 12, resulting mostly from longitudinal forces at the lower spherical joint 26. Upon radial deflection in the plane of the lower wishbone 12, the lower wishbone 12 rotates about a vertical line passing through a point half way between the compliant bushings 14, then:

If the deflection at the lower spherical joint 26=x

Then the deflection at the intermediate spherical joint=x/2; and

The deflection at the outer spherical joint 24=x

Figure 5:
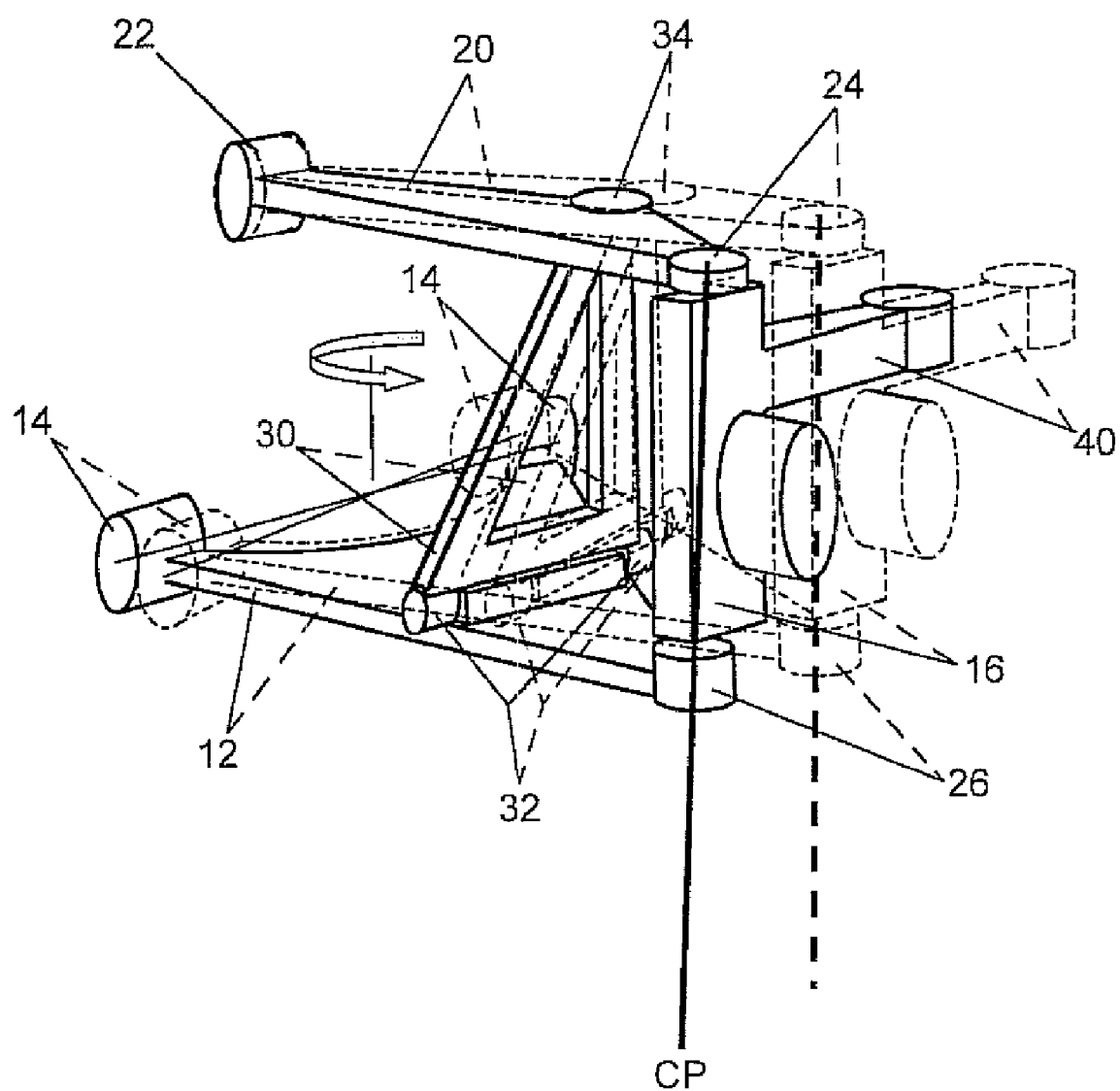
FIG. 5 is a diagrammatic illustration of the suspension system illustrated in FIG. 3, when subjected to a radial deflection in the plane of the lower wishbone.

As the lower spherical joint 26 and the outer spherical joint 24 both move x then the rotation point is at infinity, that is there will be no rotation, just pure translational movement of the swivel hub 16, as illustrated in FIG. 5.

c) Mode 3, radial deflection of the lower wishbone to body or subframe bushings 14 at right angle to the plane of the lower wishbone 12, resulting mostly from loads transmitted through the upper link 20 and the interlinking wishbone 30. Upon radial out of plane deflection, lower wishbone 12 pitches about an axis through the inner spherical bushing 22 passing half way between the compliant bushings 14, then:

deflection at the lower spherical bushing 26=0

Figure 6:
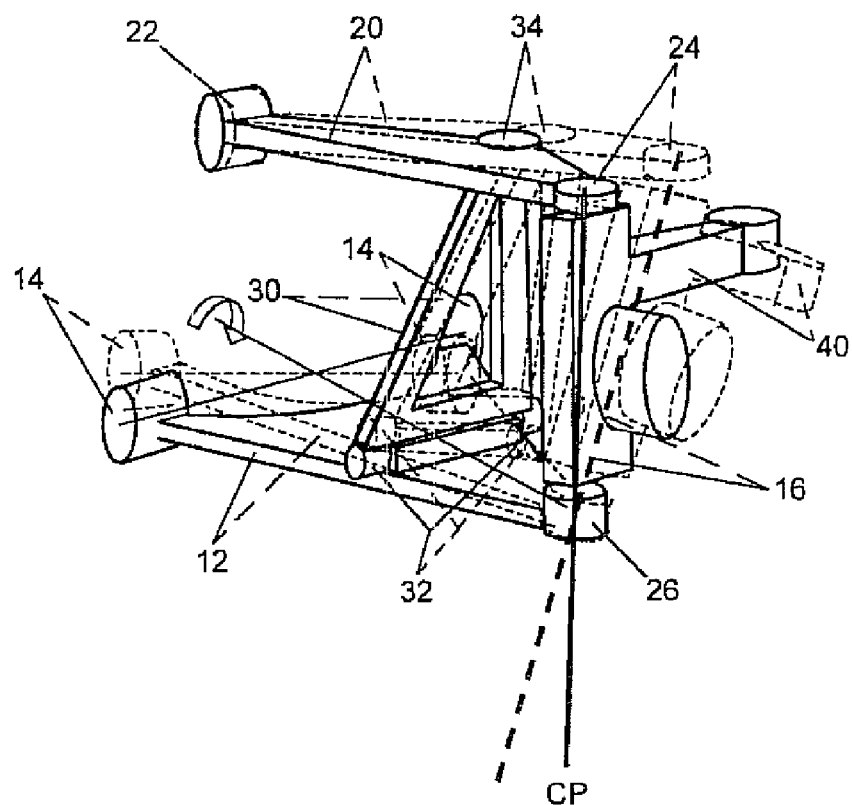
FIG. 6 is a diagrammatic illustration of the suspension system illustrated in FIG. 3, when subjected to a radial deflection normal to the plane of the lower wishbone.

If the outer spherical joint 24 moves x and the lower spherical joint does not move then the swivel hub 16 will rotate about the lower spherical joint 26, as illustrated in FIG. 6.

The use of conventional compliant bushings 14, which will typically have a high radial to axial stiffness ratio, at the inner end of lower wishbone 12, will tend to mean that mode 1 will dominate which is, for reasons previously described, the desirable characteristic. Modes 2 and 3 tend to have influences on contact patch motion in opposite directions and so, with careful tuning, these two modes can be used to counter each other. Consequently the resultant of all three modes will tend to look like mode 1.

With the center of rotation of the swivel hub at or near the contact patch, the suspension will tend to resist braking forces most strongly. Consequently the castor angle and trail will tend to resist change under braking thereby ensuring good stability. The suspension will however be far more compliant when forces are applied at wheel center height resulting in excellent isolation from road induced shock inputs.

The anti-squat and anti brake lift/dive for a particular suspension system, may be adjusted by suitable angular alignment of the pivot axis of the interlinking wishbone 30 to lower wishbone 12, with respect to the axis of the compliant bushings 14. Moreover, the position of the center of rotation of the swivel hub 16 for a given suspension system may be adjusted by suitable selection of the ratio of the distances between the inner spherical joint 22 and the intermediate spherical joint 34, and between the intermediate spherical joint 34 and outer spherical joint 24.

Figure 7:
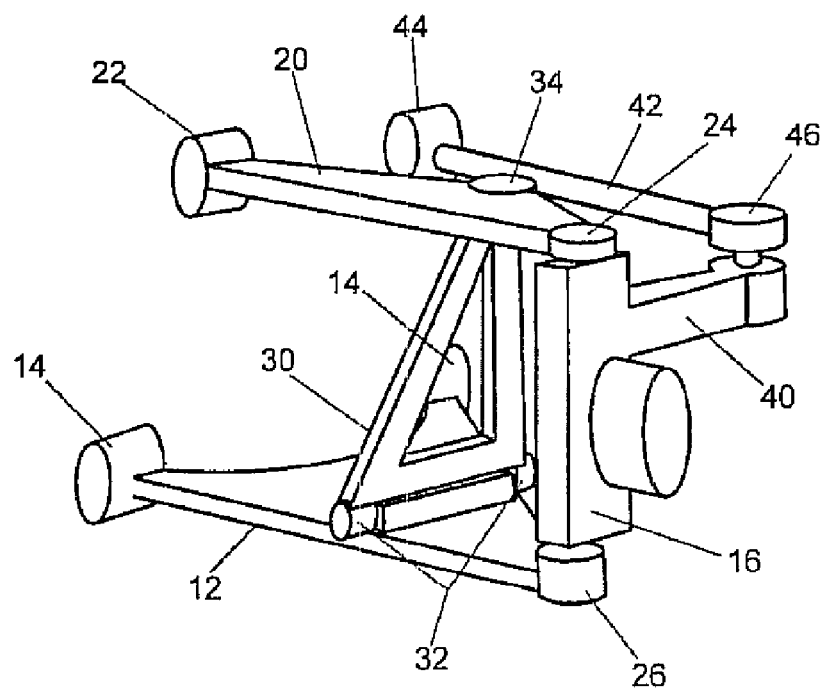
FIG. 7 illustrates diagrammatically a rear suspension system in accordance with the present invention.

As illustrated in FIG. 7, when used as a rear suspension, the arm 40 is connected to the vehicle body or subframe, by a "toe" control tie rod 42. The tie rod 42 being attached to the vehicle body or subframe by a compliant bushing 44 and to the arm 40 by a spherical joint 46.

By restraining the hub rotation point in the side elevation to be near the contact patch, in the manner described above, the level of "toe" change per unit load of throttle lift off, reacted at the wheel center, is much greater than the level of "toe" change per unit load of braking.

Moreover, in end elevation, the angle of the toe control links 42 tends to be downwards/outwards as the suspension tends towards rebound and upwards/outwards as the suspension tends towards full bump. If the hub rotation point in the side elevation is near the contact patch CP, the "toe" control link 42 on an inside wheel moving towards rebound, moves from downwards/outwards to less downwards/outwards, the lateral component of which causes the wheel to "toe out". At the same time, the outside wheel moving towards bump, will generate "toe in" for the same hub rotation in the side elevation. The "toe in" changes which result from throttle lift off will consequently always be greater on the outside wheel than on the inside wheel.

For a conventional double wishbone system which would have a hub rotation point in the side elevation, somewhere near the wheel center, the opposite is true. As a consequence an undesirable oversteer component developed from the inside wheel generating more "toe in" than the outside wheel will result.

In an alternative embodiment, a second "toe" control rod 42 may be attached to the hub carrier 16, to the front thereof. This second "toe" control rod 42 will compliment the action of the "toe" control rod mounted to the rear of the hub carrier 16.

The suitability of the suspension according to the present invention for both front and rear suspensions has the additional advantage that common components may be used for the front and rear axles of a vehicle. Moreover as adjustments to anti-brake dive or anti-lift may be contained within the suspension components themselves, not requiring any body or subframe hardpoint changes, it is furthermore possible to conventional the structure to which the front and rear suspensions are attached.

As either a front or a rear axle, the concept is exceptionally compact, more compact and lighter than other concepts which have been devised to address similar issues.

The spherical joints used in accordance with the present invention should have minimal compliance. However spherical or ball joints with stiff elastomeric elements may be used in order to improve vibration isolation.

In this specification;

"Castor angle" shall be taken to mean the angle to the vertical in the side view that the steering axis makes with the ground; and "Castor trail" shall be taken to mean the horizontal distance from the wheel center to the point where the steering axis intersects with the ground in the side view.

The invention claimed is:

1. A suspension system comprising:
   an upper link (20), the upper link (20) being mounted at an inner end to one of a vehicle body and a sub-frame by an inner spherical joint (22) and connected at an outer end to an upper end of a vertically extending hub carrier (16) by an outer spherical joint (24);
   a lower wishbone (12), the lower wishbone (12) being mounted at an inner end to the one of the vehicle body and the sub-frame for pivotal movement about a horizontal, longitudinally extending axis, by a pair of spaced compliant bushings (14) and connected at an outer end to a lower end of the hub carrier (16) by a lower spherical joint (26);
   an interlinking wishbone (30), the interlinking wishbone (30) being connected at a lower end to the lower wishbone (12), intermediate of the inner end and the outer end thereof, for pivotal movement, by one of a hinge joint and a revolute joint (32), the interim king wishbone (30) being connected at an upper end to the upper link (20) by an intermediate spherical joint (34), a center of rotation of the intermediate spherical joint (34) being offset from a line joining centers of rotation of the inner spherical joint (22) and the outer spherical joint (24); and
   the intermediate spherical joint (34) being located intermediate of the inner end and the outer end of the upper link (20), such that a ratio of distances between the inner spherical joint (22) and the intermediate spherical joint (34), and between the intermediate spherical joint (34) and the outer spherical joint (24) is substantially equal to a ratio of distances between the inner end of the lower wishbone (12) and the connection between the lower and interlinking wishbones (12, 30) and between the connection between the lower and interlinking wishbones (12, 30) and the outer end of the lower wishbone (12).

2. The suspension system according to claim 1, wherein the compliant bushings (14) have a high radial to axial stiffness ratio.

3. The suspension system according to claim 1, wherein the inner spherical joint (22), the outer spherical joint (24), the lower spherical joint (26) and the intermediate spherical joint (34) have minimal compliance.

4. The suspension system according to claim 3, wherein the inner spherical joint (22), the outer spherical joint (24), the lower spherical joint (26) and the intermediate spherical joint (34) have stiff elastomeric elements.

5. The suspension system according to claim 1, wherein the hub carrier (16) constitutes a swivel hub, the swivel hub having an arm (40) by which the swivel hub (16) is connected to a steering mechanism.

6. The suspension system according to claim 5, wherein a connection connecting the swivel hub (16) to the steering mechanism is one of located in front of a center line of a vehicle axle and behind the center line of the vehicle axle.

7. The suspension system according to claim 1, wherein an arm (40) is provided on the hub carrier (16), by which the hub carrier (16) is connected to the one of vehicle body and the sub-frame, by a "toe" control rod (42).

8. The suspension system according to claim 7, wherein the "toe" control rod (42) is connected to the one of vehicle body and the sub-frame by a compliant bushing (44) and to the arm (40) by a further spherical joint (46).

9. The suspension system according to claim 1, wherein at least one of a spring unit and a damper unit is mounted between the one of vehicle body and the sub-frame and at least one of the upper link (20), the lower wishbone (12), the interlinking wishbone (30), and the hub carrier (16).

* * * * *